(12) United States Patent
Morioka

(10) Patent No.: US 11,811,070 B2
(45) Date of Patent: *Nov. 7, 2023

(54) FUEL CELL MEMBRANE ELECTRODE ASSEMBLY AND POLYMER ELECTROLYTE FUEL CELL

(71) Applicant: TOPPAN PRINTING CO., LTD., Tokyo (JP)

(72) Inventor: Hiroyuki Morioka, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 17/225,361

(22) Filed: Apr. 8, 2021

(65) Prior Publication Data

US 2021/0226223 A1   Jul. 22, 2021

Related U.S. Application Data

(63) Continuation of application No. PCT/JP2019/039898, filed on Oct. 9, 2019.

(30) Foreign Application Priority Data

| Oct. 9, 2018 | (JP) | ................................ | 2018-191008 |
| Oct. 9, 2018 | (JP) | ................................ | 2018-191009 |
| Oct. 9, 2018 | (JP) | ................................ | 2018-191010 |

(51) Int. Cl.
   *H01M 4/86* (2006.01)
   *H01M 4/92* (2006.01)
   (Continued)

(52) U.S. Cl.
   CPC ......... *H01M 4/8657* (2013.01); *H01M 4/926* (2013.01); *H01M 8/04149* (2013.01); *H01M 8/1004* (2013.01); *H01M 2008/1095* (2013.01)

(58) Field of Classification Search
   CPC .. H01M 4/8652; H01M 4/8647; H01M 4/926; H01M 8/1004; H01M 2008/1095
   See application file for complete search history.

(56) References Cited

U.S. PATENT DOCUMENTS

| 2003/0072991 A1 | 4/2003 | Matsubara et al. | |
| 2005/0181270 A1* | 8/2005 | Sugiura | ................ H01M 4/926 |
| | | | 429/492 |

FOREIGN PATENT DOCUMENTS

| CN | 101071874 A | 11/2007 |
| CN | 103123975 | * 5/2013 |

(Continued)

OTHER PUBLICATIONS

English translation of CN Publication 103123975, May 2013.*

(Continued)

*Primary Examiner* — Brittany L Raymond
(74) *Attorney, Agent, or Firm* — Foley & Lardner LLP

(57) ABSTRACT

A fuel cell membrane electrode assembly and a polymer electrolyte fuel cell, which improve drainage in a high current range where a large amount of water is produced, without hindering water retention under low humidification conditions, and exhibit high power generation performance and durability even under high humidification conditions. A fuel cell membrane electrode assembly according to a first embodiment of the present invention includes a polyelectrolyte film, and two electrocatalyst layers sandwiching the polyelectrolyte film. At least one of the two electrocatalyst layers includes catalyst support particles with a hydrophobic coating, a polyelectrolyte, and a fibrous material having an average fiber diameter that is 10 nm or more and 300 nm or less. The fibrous material has a mass that is 0.2 times or more and 1.0 times or less the mass of the carrier in the catalyst support particles.

15 Claims, 1 Drawing Sheet

(51) Int. Cl.
H01M 8/04119 (2016.01)
H01M 8/1004 (2016.01)
H01M 8/10 (2016.01)

(56) References Cited

FOREIGN PATENT DOCUMENTS

| | | |
|---|---|---|
| JP | H07-022034 A | 1/1995 |
| JP | 2006-120506 A | 5/2006 |
| JP | 2006-252948 A | 9/2006 |
| JP | 2006-332041 A | 12/2006 |
| JP | 2007-080726 A | 3/2007 |
| JP | 2007-087651 A | 4/2007 |
| JP | 2007-141588 A | 6/2007 |

OTHER PUBLICATIONS

European Extended Search Report, dated Oct. 28, 2021, issued in corresponding European Patent Application No. 19872155.7, (7 pages).
International Searching Authority, "International Search Report," issued in connection with International Patent Application No. PCT/JP2019/039898, dated Jan. 7, 2020.
International Searching Authority, "Written Opinion," issued in connection with International Patent Application No. PCT/JP2019/039898, dated Jan. 7, 2020.

* cited by examiner

FUEL CELL MEMBRANE ELECTRODE ASSEMBLY AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/039898, filed on Oct. 9, 2019, which is based upon and claims the benefit of priority to Japanese Patent Applications Nos. 2018-191008, 2018-191009, and 2018-191010, all filed on Oct. 9, 2018, the disclosures of which are incorporated herein by reference in their entireties.

TECHNICAL FIELD

The present invention relates to fuel cell membrane electrode assemblies and polymer electrolyte fuel cells.

BACKGROUND

Fuel cells are power generation systems in which a reaction, which is reverse of electrolysis of water, is permitted to occur using electrodes containing a catalyst and using a fuel gas containing hydrogen and an oxidant gas containing oxygen, so that electricity is generated simultaneously with heat. This power generation system has characteristics of high efficiency, low environmental load, low noise, and the like compared to conventional power generation systems, and is attracting attention as a future clean energy source. Fuel cells include some varieties depending on the types of ion conductors used, and fuel cells using proton-conducting polymer films are called polymer electrolyte fuel cells.

Among fuel cells, polymer electrolyte fuel cells, which can be used near room temperature, have been anticipated for use as in-vehicle power sources or stationary power sources for domestic use, and thus a variety of research and development has been performed in recent years. Polymer electrolyte fuel cells include a membrane electrode assembly (which may be termed MEA hereinafter) in which a polyelectrolyte film is sandwiched between two electrocatalyst layers, and this membrane electrode assembly is further sandwiched between two separators.

One separator includes gas channels through which a fuel gas including hydrogen is supplied to one of the electrodes, and the other separator includes gas channels through which an oxidant gas including oxygen is supplied to the other electrode.

Herein, the electrode to which a fuel gas is supplied is referred to as a fuel electrode, and the electrode to which an oxidant gas is supplied is referred to as an air electrode. These electrodes each include a polyelectrolyte, an electrocatalyst layer including carbon particles supporting a catalyst based on noble metals such as platinum (catalyst support particles), and a gas diffusion layer having gas permeability and electron conductivity. The gas diffusion layer configuring each of the electrodes is disposed so as to face the separator, i.e., disposed between the electrocatalyst layer and the separator.

Some approaches to enhance gas diffusion have been made for electrocatalyst layers, so that the output density of fuel cells is improved. One of the approaches relates to pores in electrocatalyst layers. Pores in an electrocatalyst layer are located facing the separator via the gas diffusion layer and serve as passages for transporting multiple substances. In the fuel electrode, the pores not only contribute to smooth supply of fuel gas to a three-phase interface that is a redox reaction site, but also contribute to water supply for smooth conduction of produced protons in the polyelectrolyte film. In the air electrode, the pores not only contribute to oxidant gas supply, but also contribute to smooth removal of water produced by the electrode reaction.

Issues related to practical use of polymer electrolyte fuel cells may include improvement of output density or durability; however, the biggest issue may be cost reduction.

One approach to this cost reduction may be reducing the number of humidifiers. As the polyelectrolyte film located at the center of a membrane electrode assembly, perfluorosulfonic acid films or hydrocarbon films have been widely used. To achieve good proton conductivity, moisture control for nearly achieving a saturated water vapor pressure atmosphere is required, and therefore currently, moisture is externally supplied using humidifiers.

In this regard, polyelectrolyte films exerting sufficient proton conductivity even under low humidification conditions requiring no humidifiers are under development to reduce power consumption and simplify systems.

For example, as described in PTL 1, there is proposed a method in which, for example, a moisture control film is sandwiched between an electrocatalyst layer and a gas diffusion layer to improve water retention of the fuel cell under low humidification conditions. PTL 1 describes a method in which a humidity control film including an electrically conductive carbonaceous powder and polytetrafluoroethylene exhibits a humidity control function to prevent drying.

PTL 2 describes a method in which grooves are provided to a surface of a catalyst electrode layer contacting a polyelectrolyte film. In this method, deterioration in power generation performance under low humidification conditions is minimized by forming grooves each having a width of 0.1 mm to 0.3 mm on the surface of the catalyst electrode layer.

However, electrocatalyst layers with improved water retention may raise an issue of causing a phenomenon called "flooding" in which power generation reaction stops or lowers due to prevention of material transport in the fuel electrode and the air electrode in a high current range where a large amount of water is produced. To prevent this, configurations for enhancing drainage have been investigated (e.g., see PTLs 3, 4, 5 and 6).

However, fuel cells using electrocatalyst layers obtained through these methods have still room for improvement in terms of power generation performance or durability. Furthermore, these methods are cumbersome and raise an issue of high manufacturing cost for electrocatalyst layers.

[Citation List] [Patent Literature] PTL 1: JP 2006-252948 A; PTL 2: JP 2007-141588 A; PTL 3: JP 2006-120506 A; PTL 4: JP 2006-332041 A; PTL 5: JP 2007-87651 A; PTL 6: JP 2007-80726 A.

SUMMARY OF THE INVENTION

Technical Problem

The present invention has been made focusing on the points set forth above, and aims to provide a fuel cell membrane electrode assembly and a polymer electrolyte fuel cell, which improve drainage in a high current range where a large amount of water is produced, without hindering water retention under low humidification conditions, and exhibit high power generation performance and durability even under high humidification conditions.

Solution to Problem

To solve the issues, a fuel cell membrane electrode assembly according to an aspect of the present invention includes a polyelectrolyte film, and two electrocatalyst layers sandwiching the polyelectrolyte film. At least one of the two electrocatalyst layers includes catalyst support particles with a hydrophobic coating, a polyelectrolyte, and a fibrous material having an average fiber diameter that is 10 nm or more and 300 nm or less. The fibrous material has a mass that is 0.2 times or more and 1.0 times or less the mass of a carrier in the catalyst support particles.

A fuel cell membrane electrode assembly according to another aspect of the present invention includes a polyelectrolyte film, and two electrocatalyst layers sandwiching the polyelectrolyte film. At least one of the two electrocatalyst layers includes catalyst support particles with a hydrophobic coating, a polyelectrolyte, and a hydrophilic fibrous material having an average fiber length that is 1 μm or more and 15 μm or less. The hydrophilic fibrous material has a mass that is 0.2 times or more and 2.5 times or less the mass of a carrier in the catalyst support particles.

A fuel cell membrane electrode assembly according to another aspect of the present invention includes a polyelectrolyte film, and two electrocatalyst layers sandwiching the polyelectrolyte film. At least one of the two electrocatalyst layers includes catalyst support particles with a hydrophobic coating, a polyelectrolyte, a hydrophobic fibrous material having an average fiber diameter that is 100 nm or more and 300 nm or less, and a hydrophilic fibrous material having an average fiber diameter that is 5 nm or more and 100 nm or less. The hydrophobic fibrous material has a mass that is 0.3 times or more and 0.8 times or less the mass of a carrier in the catalyst support particles. The hydrophilic fibrous material has a mass that is 0.1 times or more and 0.3 times or less the mass of a carrier in the catalyst support particles.

A polymer electrolyte fuel cell according to an aspect of the present invention includes the fuel cell membrane electrode assembly according to any one of the aspects set forth above, two gas diffusion layers sandwiching the fuel cell membrane electrode assembly therebetween, and two separators facing each other and sandwiching the fuel cell membrane electrode assembly and the two gas diffusion layers therebetween.

Advantageous Effects of the Invention

The fuel cell membrane electrode assembly according to an aspect of the present invention can achieve a fuel cell membrane electrode assembly including electrocatalyst layers having improved water retention without hindering drainage of water or the like produced by electrode reaction and can exhibit high power generation characteristics under low humidification conditions, and can provide a polymer electrolyte fuel cell having high power generation characteristics.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

(First Embodiment)

[Membrane Electrode Assembly]

Figure 1:
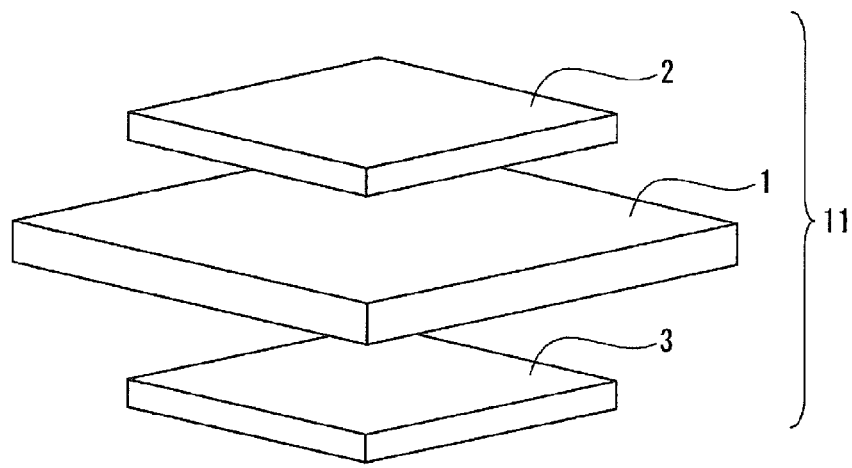
FIG. 1 is a schematic exploded perspective view illustrating a membrane electrode assembly having a fuel cell electrocatalyst layer according to an embodiment of the present invention.

FIG. 1 shows a fuel cell membrane electrode assembly (which may also be merely termed a membrane electrode assembly hereinafter) 11 according to a first embodiment including a polyelectrolyte film 1, and two electrocatalyst layers 2 and 3 vertically sandwiching the polyelectrolyte film 1.

The electrocatalyst layers 2 and 3 include catalyst support particles, and a polyelectrolyte. Of the two electrocatalyst layers 2 and 3, at least one electrocatalyst layer (which may also be termed a modified electrocatalyst layer hereinafter) includes a fibrous material. Both of the electrocatalyst layers 2 and 3 are preferred to be modified electrocatalyst layers.

In a modified electrocatalyst layer, the catalyst support particles are provided with a hydrophobic coating.

The fibrous material contained in the modified electrocatalyst layer has an average fiber diameter that is 10 nm or more and 300 nm or less. The average fiber diameter of the fibrous material is preferred to be 100 nm or more and 200 nm or less. The fibrous material is preferred to have an average fiber length that is 0.7 μm or more and 20 μm or less. The "average fiber diameter" and the "average fiber length" of the fibrous material mentioned above are an average fiber diameter and an average fiber length calculated from a SEM image.

In the modified electrocatalyst layer, the mass of the fibrous material is 0.2 times or more and 1.0 times or less the mass of the carrier in the catalyst support particles with a hydrophobic coating. The mass of the fibrous material is preferred to be 0.4 times or more and 0.8 times or less the mass of the carrier in the catalyst support particles with a hydrophobic coating.

The inventor has confirmed that the modified electrocatalyst layer configured as described above has drainage performance; however, the detailed mechanism of the drainage performance is unknown. However, the mechanism can be resumed to be as follows. It should be noted that the present invention should not be constrained at all by the resumed mechanism described below.

Due to entanglement of the fibrous material, the modified electrocatalyst layer having the above configuration exhibits high durability and good mechanical properties, e.g., minimizing the occurrence of cracking in the electrocatalyst layer, which would otherwise impair durability. Moreover, the catalyst support particles with a hydrophobic coating have an affinity for a fibrous material having hydrophobicity and thus are entangled with the fibrous material, thereby forming pores in the electrocatalyst layer. It is resumed that these pores formed may drain water produced from electrode reaction in a high current range, and may enhance diffusion of reaction gas, even in the electrocatalyst layers with improved water retention. If catalyst support particles with no hydrophobic coating are used, the catalyst support particles will exhibit hydrophilicity and will have no affinity for the fibrous material having hydrophobicity, and accordingly will fill the spaces formed by the entanglement of the fibrous material. It is resumed that, therefore, pores are unlikely to be formed in the electrocatalyst layer and, if the electrocatalyst layer has improved water retention, it may be difficult to drain water produced by electrode reaction and to enhance diffusion of reaction gas in a high current range.

It is estimated that, if the average fiber diameter of the fibrous material is less than 10 nm, pores are unlikely to be formed in the electrocatalyst layer, due to the high flexibility of the fibrous material. It is also estimated that, if the average fiber diameter of the fibrous material exceeds 300 nm, the fibrous material may not be dispersed as an ink due to the high straightness of the material.

It is estimated that, if the mass of the fibrous material is less than 0.4 times the mass of the carrier in the catalyst support particles with a hydrophobic coating, only a fewer number of pores may be formed in the electrocatalyst layer, and due to this, water produced by electrode reaction may not be sufficiently drained in a high current range, and thus diffusion of reaction gas may not be enhanced. It is also estimated that, if the mass of the fibrous material exceeds 0.8 times the mass of the carrier in the catalyst support particles with a hydrophobic coating, a large number of pores may be formed in the electrocatalyst layer, and due to this, it may be difficult to improve water retention under low humidification conditions.

It is estimated that, if the average fiber length of the fibrous material is less than 0.7 μm, mechanical properties may be impaired, due to the weak entanglement of the fibrous material. It is also estimated that, if the average fiber length of the fibrous material exceeds 20 μm, the fibrous material may not be dispersed as an ink due to strong entanglement of the material.

According to the membrane electrode assembly 11 of the first embodiment, increase of interface resistance does not impair power generation characteristics, unlike in the case of enhancing drainage performance by changing the configuration of the electrocatalyst layer as has been done in the conventional art. Accordingly, the polymer electrolyte fuel cell provided with the membrane electrode assembly 11 can enhance power generation characteristics in a high current range where a large amount of water is produced, compared to the polymer electrolyte fuel cell provided with a conventional membrane electrode assembly.

[Polymer Electrolyte Fuel Cell]

Figure 2:
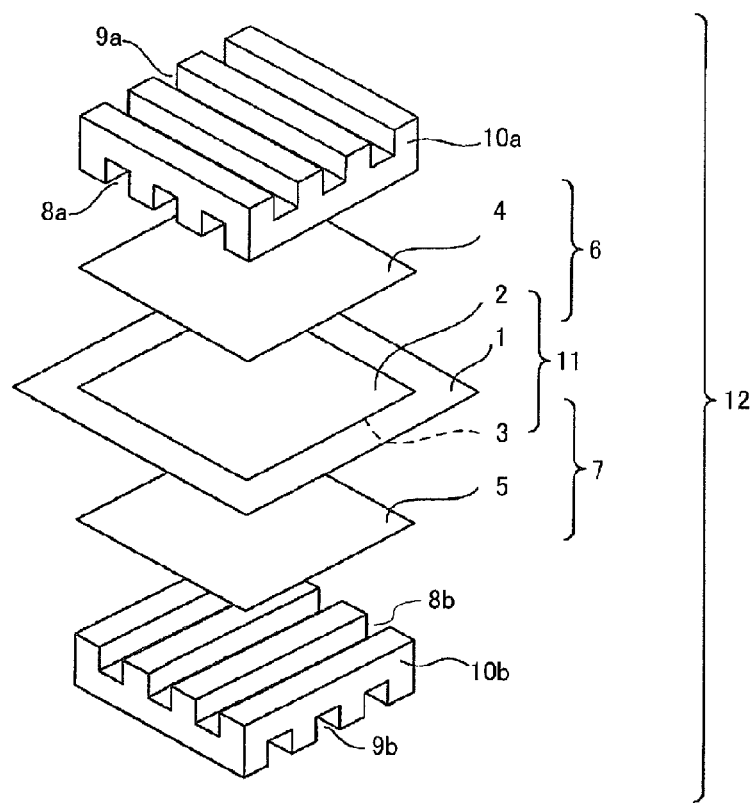
FIG. 2 is a schematic exploded perspective view illustrating a structure of a polymer electrolyte fuel cell including the membrane electrode assembly shown in FIG. 1

Referring to FIG. 2, a polymer electrolyte fuel cell provided with the membrane electrode assembly 11 of the embodiment will be described.

FIG. 2 shows a polymer electrolyte fuel cell 12 including an air electrode side gas diffusion layer 4 which is disposed facing the electrocatalyst layer 2 of the membrane electrode assembly 11, and a fuel electrode side gas diffusion layer 5 which is disposed facing the electrocatalyst layer 3. The electrocatalyst layer 2 and the diffusion layer 4 form an air electrode (cathode) 6. The electrocatalyst layer 3 and the diffusion layer 5 form a fuel electrode (anode) 7.

Two separators 10a and 10b are respectively disposed on the outside of the gas diffusion layers 4 and 5. The separators 10a and 10b are made of a material having electrical conductivity and impermeability, and respectively include gas channels 8a and 8b for passing gas therethrough, and cooling water channels 9a and 9b for passing cooling water therethrough.

Hydrogen gas, for example, is supplied as a fuel gas to the gas channels 8b of the fuel electrode 7 side separator 10b. Oxygen gas, for example, is supplied as an oxidant gas to the gas channels 8a of the air electrode 6 side separator 10a. An electromotive force can be generated between the fuel electrode 7 and the air electrode 6 by causing an electrode reaction between hydrogen as a fuel gas and oxygen as an oxidant gas in the presence of a catalyst.

In the polymer electrolyte fuel cell 12, the two separators 10a and 10b sandwich therebetween the polyelectrolyte film 1, the two electrocatalyst layers 2 and 3, and the two gas diffusion layers 4 and 5. The polymer electrolyte fuel cell 12 shown in FIG. 2 is an example of a fuel cell having a single-cell structure. However, the first embodiment may be applied to a polymer electrolyte fuel cell which is configured by laminating a plurality of cells via the separators 10a or the separators 10b.

[Method of Producing Electrocatalyst Layer]

Next, an example of a method of producing a modified electrocatalyst layer having the above configuration will be described.

The modified electrocatalyst layer is produced using a method including a first process and a second process described below.

The first process is a process of producing a catalyst ink including catalyst support particles with a hydrophobic coating, a fibrous material, a polyelectrolyte, and a solvent.

The second process is a process of forming a modified electrocatalyst layer by applying the catalyst ink obtained in the first process onto a substrate and drying the solvent.

It should be noted that an electrocatalyst layer that is not a modified electrocatalyst layer may also be produced through similar processes.

Two electrocatalyst layers 2 and 3 prepared are bonded to respective upper and lower surfaces of a polyelectrolyte film 1 to obtain a membrane electrode assembly 11.

[Details]

Further details of the membrane electrode assembly 11 and the polymer electrolyte fuel cell 12 will be described.

Any film may be used as the polyelectrolyte film 1 as long as the film has proton conductivity. For example, a fluorinated polyelectrolyte film, or a hydrocarbon polyelectrolyte film may be used. As the fluorinated polyelectrolyte film, for example, Nafion (trademark) manufactured by DuPont, Flemion (trademark) manufactured by Asahi Glass Co., Ltd., Aciplex (trademark) manufactured by Asahi Glass Co., Ltd., Gore Select (trademark) manufactured by Gore, or the like may be used.

As the hydrocarbon polyelectrolyte film, for example, an electrolyte film made of sulfonated polyether ketone, sulfonated polyether sulfone, sulfonated polyether ether sulfone, sulfonated polysulfide, sulfonated polyphenylene, or the like may be used. In particular, materials based on Nafion (trademark) manufactured by DuPont are preferred to be used as the polyelectrolyte film 1.

The electrocatalyst layers 2 and 3 are formed on respective surfaces of the polyelectrolyte film 1 using a catalyst ink. The catalyst ink for the electrocatalyst layers 2 and 3 includes catalyst support particles, a polyelectrolyte, and a solvent. The catalyst ink for a modified electrocatalyst layer includes catalyst support particles provided with water-repellent coating, a fibrous material, a polyelectrolyte, and a solvent.

Any polyelectrolyte, as long as it has proton conductivity, may be used as the polyelectrolyte contained in the catalyst ink, and thus a material similar to the material for the polyelectrolyte film 1 may be used, such as a fluorinated polyelectrolyte, or a hydrocarbon polyelectrolyte. As an example of the fluorinated polyelectrolyte, materials based on Nafion (trademark) manufactured by DuPont may be used. As the hydrocarbon polyelectrolyte, for example, an electrolyte such as of sulfonated polyether ketone, sulfonated polyether sulfone, sulfonated polyether ether sulfone, sulfonated polysulfide, or sulfonated polyphenylene may be used. In particular, materials based on Nafion (trademark) manufactured by DuPont are preferred to be used as the fluorinated polyelectrolyte.

As a catalyst used in the first embodiment (which may be termed catalyst particles or a catalyst hereinafter), for example, metals, or alloys, oxides or complex oxides thereof, or other materials may be used. Examples of the metals include platinum group elements, including platinum, palladium, ruthenium, iridium, rhodium and osmium, and other metals, such as gold, iron, lead, copper, chromium, cobalt, nickel, manganese, vanadium, molybdenum, gallium and aluminum. The complex oxide herein refers to an oxide composed of two types of metals.

If the catalyst particles are particles of one or more types of metals selected from platinum, gold, palladium, rhodium, ruthenium and iridium, the particles may exhibit good reactivity at the electrode, and thus may exhibit efficient and stable electrode reaction. If the catalyst particles are particles of one or more types of metals selected from platinum, gold, palladium, rhodium, ruthenium and iridium, the polymer electrolyte fuel cell 12 including the electrocatalyst layers 2 and 3 may present preferable high power generation characteristics.

The above catalyst particles are preferred to have an average particle size that is 0.5 nm or more and 20 nm or less, and more preferred to be 1 nm or more and 5 nm or less. The term average particle size herein refers to an average particle size calculated from X-ray diffractometry if measurements are performed for a catalyst supported by a carrier, such as carbon particles. If measurements are performed for a catalyst that is not supported by a carrier, the term average particle size refers to an arithmetic average particle size calculated from a particle size measuring method. If the average particle size of the catalyst particles is 0.5 nm or more and 20 nm or less, the catalyst activity and stability may be improved.

As an electron-conducting powder (carrier) supporting the above catalyst, carbon particles are generally used. The types of the carbon particles are not limited as long as the particles are microparticles and electrically conductive, and are not affected by the catalyst. As the carbon particles, for example, carbon black or graphite, black lead, activated carbon, carbon fibers, carbon nanotubes, or fullerene may be used.

The carbon particles are preferred to have an average particle size of 10 nm or more and 1,000 nm or less, and more preferred to be 10 nm or more and 100 nm or less. The term average particle size herein refers to an average particle size calculated from a SEM image. If the average particle size of the carbon particles is 10 nm or more and 1,000 nm or less, the catalyst activity and stability may be improved. Also, electron conduction paths may be easily formed, and gas diffusion or catalyst utilization ratio of the two electrocatalyst layers 2 and 3 may be improved.

The hydrophobic coating provided to the catalyst support particles are preferred to have a thickness sufficient for allowing a reaction gas to permeate therethrough. The thickness of the hydrophobic coating is specifically preferred to be 40 nm or less. If the thickness is larger than this, supply of the reaction gas to the active site may be hindered. If the thickness of the hydrophobic coating is 40 nm or less, the reaction gas may sufficiently permeate therethrough, so that the catalyst support particles may be imparted with hydrophobicity.

The hydrophobic coating provided to the catalyst support particles is preferred to have a thickness sufficient for repelling produced water. The thickness of the hydrophobic coating is specifically preferred to be 2 nm or more. If the thickness is smaller than this, the produced water may be retained and supply of the reaction gas to the active site may be hindered.

The hydrophobic coating provided to the catalyst support particles is composed of a fluorine compound having at least one polar group. Examples of the polar group include a hydroxyl group, alkoxy group, carboxylic group, ester group, ether group, carbonate group, and amide group. Due to the presence of the polar group, the fluorine compound can be immobilized on the outermost surface of the catalyst layer. The portion of the fluorine compound other than the polar group portion is preferred to have a structure formed of fluorine and carbon, from the perspective of achieving high hydrophobicity and chemical stability. However, the structure is not limited to this as long as the structure has sufficient hydrophobicity and chemical stability.

The fibrous material may, for example, be electron- or proton-conducting fibers. The electron-conducting fibers may be carbon fibers, carbon nanotubes, carbon nanohorns, electrically conductive polymer nanofibers, or the like. From the perspective of electrical conductivity and dispersion, it is preferred that carbon nanofibers be used as the fibrous material.

Catalytic electron-conducting fibers are more preferred from the perspective of reducing the amount of use of catalyst made of noble metal. If the electrocatalyst layer is used as an electrocatalyst layer forming the oxygen electrode, the catalytic electron-conducting fibers may be a carbon alloy catalyst prepared from carbon nanofibers. The catalytic electron-conducting fibers may be fibers processed from an electrode active material for fuel electrodes. The electrode active material may be a material containing at least one transition metal element selected from the group consisting of Ta, Nb, Ti and Zr. The material containing a fiber metal element may be a partial oxide of a carbonitride of a transition metal element, an electrically conductive oxide of a transition metal element, or an electrically conductive oxynitride of a transition metal element.

The proton-conducting fibers may be fibers processed from a proton-conducting polyelectrolyte. The material for forming proton-conducting fibers may be a fluorinated polyelectrolyte, a hydrocarbon polyelectrolyte, or the like. The fluorinated polyelectrolyte may be, for example, Nafion (trademark) manufactured by DuPont, Flemion (trademark) manufactured by Asahi Glass Co., Ltd, Aciplex (trademark) manufactured by Asahi Glass Co., Ltd, Gore Select (trademark) manufactured by Gore, or the like. The hydrocarbon polyelectrolyte may be an electrolyte such as of a sulfonated polyether ketone, sulfonated polyether sulfone, sulfonated polyether ether sulfone, sulfonated polysulfide, sulfonated polyphenylene, or the like. Of these materials, Nafion (registered trademark) manufactured by DuPont is preferred to be used as a polyelectrolyte.

For the fibrous material, fibers of the above types may be used singly or in combination of two or more. The fibrous material may be a combination of a type of electron-conducting fibers and a type of proton-conducting fibers. The fibrous material is preferred to include at least one selected from the group consisting of carbon nanofibers, carbon nanotubes, and electrolyte fibers, among the fibers mentioned above.

There is no particular limitation on the solvent used as the dispersion medium of the catalyst ink as long as the solvent does not erode the catalytic material support particles or the polyelectrolyte, and is capable of dissolving the polyelectrolyte in a highly fluid state or dispersing the polyelectrolyte as fine gel. However, the solvent is preferred to include at least a volatile organic solvent. Examples of the solvent that can be used as a dispersion medium of the catalyst ink include alcohols, such as methanol, ethanol, 1-propanol, 2-propanol, 1-butanol, 2-butanol, isobutylalcohol, tert-butylalcohol, and pentanol; ketone solvents, such as acetone, methylethylketone, pentanone, methylisobutylketone, heptanone, cyclohexanone, methylcyclohexanone, acetonylacetone, and diisobutyl ketone; ether solvents, such as tetrahydrofuran, dioxane, diethyleneglycol dimethyl ether, anisole, methoxytoluene, and dibutyl ether; and polar solvents, such as dimethylformamide, dimethylacetamide, N-methylpyrrolidone, ethylene glycol, diethylene glycol, diacetone alcohol, and 1-methoxy-2-propanol. The solvent may be a mixture of two or more of the above materials.

If the solvent used as a dispersion medium of the catalyst ink is a lower alcohol, the alcohol is preferred to be mixed with water because solvents using lower alcohols have a high risk of ignition. The solvent may contain water having a good affinity (or water having a high affinity) for polyelectrolyte. The amount of water to be added is not particularly limited unless the polyelectrolyte separates and causes white turbidity or gelation.

The catalyst ink may include a dispersant to disperse the catalytic material support particles. The dispersant may, for example, be an anionic surfactant, cationic surfactant, amphoteric surfactant, nonionic surfactant, or the like.

Examples of the anionic surfactant may include carboxylic acid type surfactants, such as alkyl ether carboxylate, ether carboxylate, alkanoyl sarcosine, alkanoyl glutamate, acyl glutamate, oleic acid/N-methyltaurine, potassium oleate/diethanolamine salt, alkyl ether sulfate/triethanolamine salt, polyoxyethylene alkyl ether sulfate/triethanolamine salt, amine salt of special modified polyether ester acid, amine salt of higher fatty acid derivative, amine salt of special modified polyester acid, amine salt of high molecular weight polyether ester acid, amine salt of special modified phosphate ester, high molecular weight polyesteric acid amidamine salt, amidoamine salt of special fatty acid derivative, alkylamine salt of higher fatty acid, amidoamine salt of high molecular weight polycarboxylic acid, sodium laurate, sodium stearate, and sodium oleate; sulfonic acid type surfactants, such as dialkyl sulfosuccinate, dialkyl sulfosuccinate, 1,2-bis (alkoxycarbonyl)-1-ethanesulfonate, alkyl sulfonate, alkyl sulfonate, paraffin sulfonate, α-olefin sulfonate, linear alkylbenzene sulfonate, alkylbenzene sulfonate, polynaphthyl methanesulfonate, polynaphthyl methanesulfonate, naphthalene sulfonate-formalin condensate, alkylnaphthalene sulfonate, alkanoyl methyltaurine, lauryl sulfate ester sodium salt, cetyl sulfate ester sodium salt, stearyl sulfate ester sodium salt, oleyl sulfate ester sodium salt, lauryl ether sulfate ester salt, sodium alkylbenzene sulfonate, oil-soluble alkylbenzene sulfonate, and α-olefin sulfonate; sulfuric acid ester type surfactants, such as alkyl sulfuric ester salt, alkyl sulfate salt, alkyl sulfate, alkyl ether sulfate, polyoxyethylene alkyl ether sulfate, alkyl polyethoxysulfate, polyglycol ether sulfate, alkyl polyoxyethylene sulfate, sulfated oil, and highly sulfated oil; and phosphoric acid ester type surfactants, such as phosphoric acid (mono or di) alkyl salt, (mono or di) alkyl phosphate, (mono or di) alkyl phosphate ester salt, alkyl phosphate polyoxyethylene salt, alkyl ether phosphate, alkyl polyethoxy phosphate, polyoxyethylene alkyl ether, alkyl phenyl phosphate/polyoxyethylene salt, alkylphenyl ether/phosphate, alkylphenyl/polyethoxy phosphate, polyoxyethylene/alkylphenyl/ether phosphate, higher alcohol phosphoric acid monoester disodium salt, higher alcohol phosphoric acid diester disodium salt, and zinc dialkyldithiophosphate.

Examples of the cationic surfactants may include benzyldimethyl {2-[2-(P-1,1,3,3-tetramethylbutylphenoxy) ethoxy] ethyl} ammonium chloride, octadecylamine acetate, tetradecylamine acetate, octadecyltrimethylammonium chloride, beef tallow trimethylammonium chloride, dodecyltrimethylammonium chloride, coconut trimethylammonium chloride, hexadecyltrimethylammonium chloride, behenyltrimethylammonium chloride, coconut dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salt, 2-heptadecenyl-hydroxyethyl imidazoline, stearamide ethyldiethylamine acetate, stearamide ethyldiethylamine hydrochloride, triethanolamine monostearate formate, alkylpyridium salt, higher alkylamine ethylene oxide adduct, polyacrylamide amine salt, modified polyacrylamide amine salt, and perfluoroalkyl quaternary ammonium iodide.

Examples of the amphoteric surfactant may include dimethylcocobetaine, dimethyllauryl betaine, sodium lauryl aminoethyl glycine, sodium lauryl aminopropionate, stearyldimethylbetaine, lauryl dihydroxyethyl betaine, amido betaine, imidazolium betaine, lecithin, 3-[ω-fluoroalkanoyl-N-ethylamino]-1-sodium propanesulfonate, and N-[3-(perfluorooctane sulfonamide) propyl-N, N-dimethyl-N-carboxymethylene ammonium betaine.

Examples of the nonionic surfactant may include coconut fatty acid diethanolamide (1:2 type), coconut fatty acid diethanolamide (1:1 type), bovine fatty acid diethanolamide (1:2 type), bovine fatty acid diethanolamide (1:1 type), oleic acid diethanolamide (1:1 type), hydroxyethyl lauryl amine, polyethylene glycol laurylamine, polyethylene glycol coconut amine, polyethylene glycol stearylamine, polyethylene glycol beef tallow amine, polyethylene glycol beef tallow propylene diamine, polyethylene glycol dioleylamine, dimethyllaurylamine oxide, dimethylstearylamine oxide, dihydroxyethyllaurylamine oxide, perfluoroalkylamine oxide, polyvinylpyrrolidone, higher alcohol ethylene oxide adduct, alkylphenol ethylene oxide adduct, fatty acid ethylene oxide adduct, polypropylene glycol ethylene oxide adduct, fatty acid ester of glycerin, fatty acid ester of pentaerythrite, fatty acid ester of sorbitol, fatty acid ester of sorbitan, and fatty acid ester of sugar.

Of the surfactants mentioned above, the sulfonic acid type surfactants, such as alkylbenzene sulfonic acid, oil-soluble alkylbenzene sulfonic acid, α-olefin sulfonic acid, sodium alkylbenzene sulfonate, oil-soluble alkylbenzene sulfonate, and α-olefin sulfonate, are preferred for use as a surfactant when considering the carbon dispersion effect, variation of catalytic performance due to residual dispersant, and the like.

If the amount of the polyelectrolyte in the catalyst ink is increased, the pore volume may be generally decreased. If the amount of the carbon particles in the catalyst ink is increased, the pore volume may be increased. Use of a dispersant may decrease the pore volume.

The catalyst ink is subjected to dispersion treatment, as necessary. The viscosity of the catalyst ink and the size of the particles in the catalyst ink can be controlled according to the conditions of the dispersion treatment of the catalyst ink. The dispersion treatment can be conducted using various devices. The method of the dispersion treatment is not particularly limited. For example, the dispersion treatment may be a treatment using a ball mill or a roll mill, a treatment using a shear mill, a treatment using a wet mill, an ultrasonic dispersion treatment, or other treatments. Alternatively, the dispersion treatment may be conducted using a homogenizer or the like so that the catalyst ink can be stirred by centrifugal force. The pore volume is reduced as the dispersion time is increased because the aggregates of the catalyst support particles are destroyed.

An excessively large solid content of the catalyst ink may increase the viscosity of the catalyst ink and may easily cause cracking on the surfaces of the electrocatalyst layers 2 and 3. An excessively small solid content of the catalyst ink may make the film formation rate very slow and accordingly may lower the productivity. Therefore, the solid content of the catalyst ink is preferred to be 1 mass % (wt %) or more and 50 mass % or less.

The solids are composed of the catalytic material support particles and the polyelectrolyte. If the content of the catalytic material support particles is increased in the solids, viscosity may be enhanced even when the solid content remains unchanged. If the content of the catalytic material support particles is reduced in the solids, viscosity may be lowered even when the solid content remains unchanged. Accordingly, the ratio of the catalytic material support particles to the solids is preferred to be 10 mass % or more and 80 mass % or less. Furthermore, the viscosity of the catalyst ink is preferred to be about 0.1 cP or more and 500 cP or less (0.0001 Pas or more and 0.5 Pas or less), and is more preferred to be 5 cP or more and 100 cP or less (0.005 Pas or more and 0.1 Pas or less). Viscosity can also be controlled by adding a dispersant when dispersing the catalyst ink.

The catalyst ink may include a pore-forming agent. Pores can be formed by removing the pore-forming agent after formation of the electrocatalyst layer. The pore-forming agent may be a material dissolving in an acid, an alkali or water, a sublimating material, such as camphor, a thermally decomposable material, or the like. If the pore-forming agent is a material dissolving in warm water, it may be removed with the water produced during power generation.

Examples of the pore-forming agent dissolving in an acid, an alkali or water may include acid-soluble inorganic salts, inorganic salts soluble in an alkaline aqueous solution, metals soluble in acids or alkalis, water-soluble inorganic salts, and water-soluble organic compounds. The acid-soluble inorganic salts may be calcium carbonate, barium carbonate, magnesium carbonate, magnesium sulfate, magnesium oxide, and the like. The inorganic salts soluble in an alkaline aqueous solution may be, alumina, silica gel, silica sol, and the like. The metals soluble in acids or alkalis may be aluminum, zinc, tin, nickel, iron, and the like. The water-soluble inorganic salts may be sodium chloride, potassium chloride, ammonium chloride, sodium carbonate, sodium sulfate, monosodium phosphate, and the like. The water-soluble organic compounds may be polyvinyl alcohol, polyethylene glycol, and the like.

The pore-forming agents mentioned above may be used singly, or in combination or two or more. It is preferred however that they are used in combination of two or more.

As the method of coating a catalyst ink onto the substrate, for example, doctor blading, dipping, screen printing, roll coating, or the like may be used.

As substrates used for producing the electrocatalyst layers 2 and 3, transfer sheets may be used.

The transfer sheets used as the substrates may only have to be a material having good transfer properties, e.g., fluororesins, such as ethylene-tetrafluoroethylene copolymer (ETFE), tetrafluoroethylene-hexafluoropropylene copolymer (FEP), tetrafluoro-perfluoroalkyl vinyl ether copolymer (PFA), and polytetrafluoroethylene (PTFE). Furthermore, polymer films or sheets such as of polyimide, polyethylene terephthalate, polyamide (Nylon (trademark)), polysulfone, polyethersulfone, polyphenylene sulfide, polyether ether ketone, polyetherimide, polyarylate, and polyethylene naphthalate may be used as transfer sheets. If transfer sheets are used as the substrates, electrode films, i.e., coating films from which the solvent has been removed, may be bonded to the polyelectrolyte film 1 and then the transfer sheets may be separated, thereby forming a membrane electrode assembly 11 provided with electrocatalyst layers 2 and 3 on respective surfaces of the polyelectrolyte film 1.

For the gas diffusion layers 4 and 5, materials having gas diffusion properties and electrical conductivity can be used. For example, porous carbon materials, such as carbon cloth, carbon paper, and nonwoven fabric, can be used as the gas diffusion layers 4 and 5.

For the separators 10 (10a and 10b), carbon or metal materials, or other materials can be used. It should be noted that the gas diffusion layers 4 and 5 may be integrated with the respective separators 10 (10a and 10b). If the separators 10 (10a and 10b) or the electrocatalyst layers 2 and 3 serve as the gas diffusion layers 4 and 5, the gas diffusion layers 4 and 5 may be omitted. The polymer electrolyte fuel cell 12 can be produced by assembling a gas supply device, a cooling device, and other accompanying devices together.

<Advantageous Effects and Others>

The first embodiment describes a membrane electrode assembly 11 exhibiting high power generation characteristics under high humidification conditions, a method of producing the membrane electrode assembly 11, and a polymer electrolyte fuel cell 12 provided with the membrane electrode assembly 11. The electrocatalyst layers 2 and 3 of the membrane electrode assembly 11 of the first embodiment can achieve high durability and mechanical characteristics due to entanglement of the fibrous material therein having high crystallinity, so that the occurrence of cracking can be reduced or prevented in the electrocatalyst layers, which would otherwise impair durability. Furthermore, the catalyst support particles with a hydrophobic coating have an affinity for the fibrous material having hydrophobicity and thus may entail entanglement of the fibrous material, thereby forming pores in the electrocatalyst layers. These pores formed may drain water produced from electrode reaction in a high current range, and may enhance diffusion of reaction gas, even in the electrocatalyst layers with improved water retention.

The membrane electrode assembly produced through the method of producing an electrocatalyst layer according to the first embodiment can improve drainage in a high current range where a large amount of water is produced, without hindering water retention under low humidification conditions, and can exhibit high power generation performance and durability even under high humidification conditions. Using the method of producing an electrocatalyst layer according to the first embodiment, the membrane electrode assembly as described above can be easily, efficiently and economically produced.

In other words, the membrane electrode assembly described above can be produced by only forming electrocatalyst layers using a catalyst ink in which platinum-carrying carbon catalyst (catalyst support particles) with a hydrophobic coating, polyelectrolyte, and a fibrous material are dispersed in a solvent.

Accordingly, the membrane electrode assembly can be produced without involving complicated production processes, and in addition, use of the electrocatalyst layers produced through the above procedure can improve both water retention and reaction gas diffusion. Thus, this membrane electrode assembly can be operated without providing special devices, e.g., humidifiers or the like, and can contribute to cost reduction.

Of the electrocatalyst layers 2 and 3 formed on respective surfaces of the polyelectrolyte film 1, one may be a modified electrocatalyst layer. In this case, the modified electrocatalyst layer is preferred to be disposed on the air electrode (cathode) side where water is produced due to electrode reaction. However, from the perspective of drainage in a high current range, modified electrocatalyst layers are preferred to be formed on respective surfaces of the polyelectrolyte film 1.

The first embodiment of the present invention has been described in detail so far. Practically, however, the present invention should not be limited to the above embodiment. Modifications not departing from the spirit of the present invention are also encompassed in the present invention.

First Example

Hereunder, a description will be given of a method of producing a modified electrocatalyst layer and a membrane electrode assembly for use in the polymer electrolyte fuel cell according to the first embodiment, through specific examples and comparative examples. However, the first embodiment should not be limited by the following examples and comparative examples.

In the following examples and comparative examples, the two electrocatalyst layers are both modified electrocatalyst layers. Optionally, only one of the two electrocatalyst layers may be a modified electrocatalyst layer.

Example 1-1

[Preparation of Catalyst Ink]

A platinum-carrying carbon catalyst (catalyst support particles) with a loading density of 50 mass % and a hydrophobic coating of 20 nm thickness, a 25 mass % polyelectrolyte solution with an ion exchange capacity of 0.7 meq/g, and a fibrous material having an average fiber diameter of 150 nm and an average fiber length of 6 µm were mixed in a solvent and subjected to dispersion treatment using a planetary ball mill. With 30-minute dispersion, a catalyst ink was prepared.

In the prepared catalyst ink, the composition ratio between the starting materials, i.e., between the fibrous material, the carbon as a carrier, and the polyelectrolyte, was 0.5:1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Example 1-1.

Comparative Example 1-1

[Preparation of Catalyst Ink]

A platinum-carrying carbon catalyst (catalyst support particles) with a loading density of 50 mass % and no hydrophobic coating, a 25 mass % polyelectrolyte solution with an ion exchange capacity of 0.7 meq/g, and a fibrous material having an average fiber diameter of 150 nm and an average fiber length of 6 µm were mixed in a solvent and subjected to dispersion treatment using a planetary ball mill. With 30-minute dispersion, a catalyst ink was prepared.

In the prepared catalyst ink, the composition ratio between the starting materials, i.e., between the fibrous material, the carbon as a carrier, and the polyelectrolyte, was 0.5:1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm² in the electrocatalyst layer serving as a fuel electrode (anode), and that the platinum carried was 0.3 mg/cm² in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0×10⁶ Pa transfer pressure, thereby preparing a membrane electrode assembly of Comparative Example 1-1.

Comparative Example 1-2

[Preparation of Catalyst Ink]

A platinum-carrying carbon catalyst (catalyst support particles) with a loading density of 50 mass % and no hydrophobic coating, and a 25 mass % polyelectrolyte solution with an ion exchange capacity of 0.7 meq/g were mixed in a solvent and subjected to dispersion treatment using a planetary ball mill. With 30-minute dispersion, a catalyst ink was prepared.

In the prepared catalyst ink, the composition ratio between the starting materials, i.e., between the carbon as a carrier, and the polyelectrolyte, was 1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm² in the electrocatalyst layer serving as a fuel electrode (anode), and that the platinum carried was 0.3 mg/cm² in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0×10⁶ Pa transfer pressure, thereby preparing a membrane electrode assembly of Comparative Example 1-2.

<Evaluation>

[Power Generation Characteristics]

The membrane electrode assemblies obtained in Example 1-1 and Comparative Examples 1-1 and 1-2 were each bonded to two pieces of carbon paper as gas diffusion layers so as to be sandwiched therebetween, thereby preparing samples. The samples were each set in a power generation evaluation cell, and current and voltage were measured using a fuel cell measurement device.

The cell temperature during the measurement was 60° C., and high humidification and low humidification set forth below were used as operation conditions. Hydrogen as a fuel gas was passed at a flow rate achieving a hydrogen utilization of 90%, while air as an oxidant gas was passed at a flow rate achieving an oxygen utilization of 50%. The back pressure was 50 kPa.

[Operation Conditions]

Condition 1 (high humidification): Relative humidity was 90% RH for anode, and 90% RH for cathode.

Condition 2 (low humidification): Relative humidity was 90% RH for anode, and 40% RH for cathode.

[Measurements]

The membrane electrode assembly of Example 1-1 showed better power generation performance under the high humidification operation conditions than the membrane electrode assemblies of Comparative Examples 1-1 and 1-2.

Furthermore, even under the high humidification operation conditions, the membrane electrode assembly of Example 1-1 exhibited power generation performance of a level equivalent to the power generation performance under the low humidification operation conditions. In particular, the power generation performance near current density of 1.2 A/cm² was improved.

The membrane electrode assembly of Example 1-1 exhibited power generation characteristics of having a cell voltage at a current density of 1.2 A/cm² which was higher by 0.17 V than the cell voltage at a current density of 1.2 A/cm² of the membrane electrode assembly of Comparative Example 1-1, and having a cell voltage at a current density of 1.2 A/cm² which was higher by 0.24 V than the cell voltage at a current density of 1.2 A/cm² of the membrane electrode assembly of Comparative Example 1-2.

As a result of comparing the membrane electrode assembly of Example 1-1 with the membrane electrode assemblies of Comparative Examples 1-1 and 1-2 in terms of power generation characteristics, it was confirmed that the membrane electrode assembly of Example 1-1 showed high drainage performance, and the power generation characteristics thereof under the high humidification operation conditions were equivalent to those under low humidification operation conditions.

Furthermore, under the low humidification operation conditions, the membrane electrode assembly of Example 1-1 exhibited power generation characteristics of having a cell voltage at a current density of 1.2 A/cm² which was higher by 0.19 V than the cell voltage at a current density of 1.2 A/cm² of the membrane electrode assembly of Comparative Example 1-1, and having a cell voltage at a current density of 1.2 A/cm² which was higher by 0.26 V than the cell voltage at a current density of 1.2 A/cm² of the membrane electrode assembly of Comparative Example 1-2.

As a result of comparing the membrane electrode assembly of Example 1-1 with the membrane electrode assemblies of Comparative Examples 1-1 and 1-2 in terms of power generation characteristics, it was confirmed that the membrane electrode assembly of Example 1-1 showed high drainage performance for water produced by electrode reaction, and water retention thereof under the low humidification conditions was not hindered.

(Second Embodiment)

[Membrane Electrode Assembly]

As shown in FIG. 1, a membrane electrode assembly 11 according to a second embodiment has a configuration that is the same as that of the membrane electrode assembly 11 according to the first embodiment, and includes a polyelectrolyte film 1, and two electrocatalyst layers 2 and 3 vertically sandwiching the polyelectrolyte film 1.

The electrocatalyst layers 2 and 3 include catalyst support particles, and a polyelectrolyte as in the first embodiment. Of the two electrocatalyst layers 2 and 3, at least one electrocatalyst layer (which may also be termed a modified electrocatalyst layer hereinafter) includes a hydrophilic fibrous material. Both of the electrocatalyst layers 2 and 3 are preferred to be modified electrocatalyst layers.

In the modified electrocatalyst layer, the catalyst support particles are provided with a hydrophobic coating as in the first embodiment.

The hydrophilic fibrous material contained in the modified electrocatalyst layer has an average fiber length that is 1 µm or more and 15 µm or less.

The hydrophilic fibrous material contained in the modified electrocatalyst layer is preferred to have an average fiber diameter that is 50 nm or more and 0.8 µm or less.

The "average fiber length" and the "average fiber diameter" of the hydrophilic fibrous material mentioned above are an average fiber length and an average fiber diameter calculated from an SEM image.

The mass of the hydrophilic fibrous material contained in the modified electrocatalyst layer is 0.2 times or more and 2.5 times or less the mass of the carrier in the catalyst support particles with a hydrophobic coating.

The inventor has confirmed that a modified electrocatalyst layer configured as set forth below has drainage performance; however, the detailed mechanism of the drainage performance is unknown. However, the mechanism can be resumed to be as follows. It should be noted that the present invention should not be constrained at all by the mechanism set forth below.

Due to entanglement of the hydrophilic fibrous material, the modified electrocatalyst layer having the above configuration exhibits high durability and mechanical properties, e.g., minimizing cracking in the electrocatalyst layer, which would otherwise impair durability. The catalyst support particles with a hydrophobic coating have no affinity for the hydrophilic fibrous material, and thus remain separated from the hydrophilic fibrous material. It is resumed that the structure formed may drain water produced from electrode reaction in a high current range, and may enhance diffusion of reaction gas, even in the electrocatalyst layers with improved water retention. If catalyst support particles with no hydrophobic coating are used, the catalyst support particles will exhibit hydrophilicity and will have an affinity for the hydrophilic fibrous material, and accordingly will remain close to the hydrophilic fibrous material. It is resumed that, therefore, water produced by electrode reaction may be retained at surfaces of the catalyst support particles in an electrocatalyst layer with improved water retention, and accordingly, it may be difficult to drain water and to enhance diffusion of reaction gas in a high current range.

It is estimated that, if the average fiber length of the hydrophilic fibrous material is less than 1 µm, mechanical properties may be impaired, due to the weak entanglement of the hydrophilic fibrous material. It is also estimated that, if the average fiber length of the hydrophilic fibrous material exceeds 15 µm, the hydrophilic fibrous material may not be dispersed as an ink due to the strong entanglement of the material.

It is estimated that, if the mass of the hydrophilic fibrous material is less than 0.2 times the mass of the carrier in the catalyst support particles with a hydrophobic coating, a smaller number of pores may be formed in the electrocatalyst layer, and due to this, water produced by electrode reaction may not be sufficiently drained in a high current range, and thus diffusion of reaction gas may not be enhanced. It is also estimated that, if the mass of the hydrophilic fibrous material exceeds 2.5 times the mass of the carrier in the catalyst support particles with a hydrophobic coating, a large number of pores may be formed in the electrocatalyst layer, and due to this, it may be difficult to improve water retention under low humidification conditions.

It is estimated that, if the average fiber diameter of the hydrophilic fibrous material is less than 50 nm, pores are unlikely to be formed in the electrocatalyst layer, due to the high flexibility of the hydrophilic fibrous material. It is also estimated that, if the average fiber diameter of the hydrophilic fibrous material exceeds 0.8 µm, the hydrophilic fibrous material may not be dispersed as an ink due to the high straightness of the material.

According to the membrane electrode assembly 11 of the second embodiment, increase of interface resistance does not impair power generation characteristics, unlike in the case of enhancing drainage performance by changing the configuration of the electrocatalyst layer as in the conventional art. Accordingly, the polymer electrolyte fuel cell provided with the membrane electrode assembly 11 can enhance power generation characteristics in a high current range where a large amount of water is produced, compared to the polymer electrolyte fuel cell provided with a conventional membrane electrode assembly.

[Polymer Electrolyte Fuel Cell]

The configuration of the polymer electrolyte fuel cell 12 according to the second embodiment is the same as that of the polymer electrolyte fuel cell 12 described in the first embodiment. Therefore, description is omitted herein.

[Method of Producing Electrocatalyst Layer]

Next, an example of a method of producing a modified electrocatalyst layer according to the second embodiment will be described.

The modified electrocatalyst layer is produced using a method including a first process and a second process described below.

The first process is a process of producing a catalyst ink including catalyst support particles with a hydrophobic coating, a hydrophilic fibrous material, a polyelectrolyte, and a solvent.

The second process is a process of forming a modified electrocatalyst layer by applying the catalyst ink obtained in the first process onto a substrate and drying the solvent.

It should be noted that an electrocatalyst layer that is not a modified electrocatalyst layer may also be produced through similar processes.

Two electrocatalyst layers 2 and 3 prepared are bonded to respective upper and lower surfaces of a polyelectrolyte film 1 to obtain a membrane electrode assembly 11.

[Details]

The membrane electrode assembly 11 and the polymer electrolyte fuel cell 12 of the second embodiment are different from those of the first embodiment in that the fibrous material has been replaced by a hydrophilic fibrous material, and are the same in other components, such as the type of the polyelectrolyte, as the first embodiment. Therefore, only the hydrophilic fibrous material will be described herein, and other components, such as the type of the polyelectrolyte, will be omitted from description.

The hydrophilic fibrous material may, for example, be proton-conducting fibers obtained by processing a polyelectrolyte into fibers. Use of the proton-conducting fibers may improve proton conductivity.

The proton-conducting fibers may be fibers processed from a proton-conducting polyelectrolyte. The material for forming proton-conducting fibers may be a fluorinated polyelectrolyte, a hydrocarbon polyelectrolyte, or the like. The fluorinated polyelectrolyte may be, for example, Nafion (trademark) manufactured by DuPont, Flemion (trademark)

manufactured by Asahi Glass Co., Ltd, Aciplex (trademark) manufactured by Asahi Glass Co., Ltd, Gore Select (trademark) manufactured by Gore, or the like. The hydrocarbon polyelectrolyte may be an electrolyte such as of a sulfonated polyether ketone, sulfonated polyether sulfone, sulfonated polyether ether sulfone, sulfonated polysulfide, sulfonated polyphenylene, or the like. Of these materials, Nafion (registered trademark) manufactured by DuPont is preferred to be used as a polyelectrolyte.

For the hydrophilic fibrous material, fibers of the above types may be used singly or in combination of two or more.

<Advantageous Effects and Others>

The second embodiment describes a membrane electrode assembly 11 exhibiting high power generation characteristics under high humidification conditions, a method of producing the membrane electrode assembly 11, and a polymer electrolyte fuel cell 12 provided with the membrane electrode assembly 11. The second embodiment can achieve high durability and mechanical characteristics in the electrocatalyst layers 2 and 3 of the membrane electrode assembly 11 due to entanglement of the hydrophilic fibrous material therein, so that the occurrence of cracking can be reduced or prevented in the electrocatalyst layers, which would otherwise impair durability. The catalyst support particles with a hydrophobic coating have no affinity for the hydrophilic fibrous material, and thus remain separated from the hydrophilic fibrous material. The structure formed may drain water produced from electrode reaction in a high current range, and may enhance diffusion of reaction gas, even in the electrocatalyst layers with improved water retention. Specifically, the membrane electrode assembly 11 of the second embodiment is characterized in that it includes catalyst support particles with a hydrophobic coating, a polyelectrolyte, and a hydrophilic fibrous material having an average fiber length that is 1 μm or more and 15 μm or less, and that the mass of the hydrophilic fibrous material is 0.2 times or more and 2.5 times or less the mass of the carrier in the catalyst support particles. Therefore, the obtained membrane electrode assembly 11 including the electrocatalyst layers 2 and 3 can improve water retention without hindering drainage of water or the like produced in electrode reaction and can exhibit high power generation characteristics even under low humidification conditions, and thus a polymer electrolyte fuel cell 12 having high power generation performance can be achieved.

In this way, the membrane electrode assembly produced through the method of producing an electrocatalyst layer according to the second embodiment can improve drainage in a high current range where a large amount of water is produced, without hindering water retention under low humidification conditions, and can exhibit high power generation performance and durability even under high humidification conditions, as in the first embodiment. Using the method of producing an electrocatalyst layer according to the second embodiment, the membrane electrode assembly as described above can be easily, efficiently and economically produced.

In other words, the membrane electrode assembly described above can be produced by only forming electrocatalyst layers using a catalyst ink in which platinum-carrying carbon catalyst (catalyst support particles) with a hydrophobic coating, a polyelectrolyte, and a hydrophilic fibrous material are dispersed in a solvent.

Accordingly, as in the first embodiment, the membrane electrode assembly can be produced without complicated production processes, and in addition, use of the electrocatalyst layers produced through the above procedure can improve both water retention and reaction gas diffusion. Thus, this membrane electrode assembly can be used without special devices, e.g., humidifiers or the like, and can contribute to cost reduction.

Of the electrocatalyst layers 2 and 3 formed on respective surfaces of the polyelectrolyte film 1, one may be a modified electrocatalyst layer as in the first embodiment. In this case, the modified electrocatalyst layer is preferred to be disposed on the air electrode (cathode) side where water is produced due to electrode reaction. However, from the perspective of drainage in a high current range, modified electrocatalyst layers are preferred to be formed on respective surfaces of the polyelectrolyte film 1.

Second Example

Hereunder, a description will be given of a method of producing a modified electrocatalyst layer and a membrane electrode assembly for use in the polymer electrolyte fuel cell according to the second embodiment, through specific examples and comparative examples. However, the second embodiment should not be limited by the following examples and comparative examples.

In the following examples and comparative examples, the two electrocatalyst layers are both modified electrocatalyst layers. Optionally, only one of the two electrocatalyst layers may be a modified electrocatalyst layer.

Example 2-1

[Preparation of Catalyst Ink]

A platinum-carrying carbon catalyst (catalyst support particles) with a loading density of 50 mass % and a hydrophobic coating of 25 nm thickness, a 25 mass % polyelectrolyte solution with an ion exchange capacity of 0.7 meq/g, and proton-conducting fibers (hydrophilic fibrous material) having an average fiber length of 1.5 μm were mixed in a solvent and subjected to dispersion treatment using a planetary ball mill. With 30-minute dispersion, a catalyst ink was prepared. In the prepared catalyst ink, the composition ratio between the starting materials, i.e., between the proton-conducting fibers, the carbon as a carrier, and the polyelectrolyte, was 0.6:1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Example 2-1.

Comparative Example 2-1

[Preparation of Catalyst Ink]

A platinum-carrying carbon catalyst (catalyst support particles) with a loading density of 50 mass % and no hydrophobic coating, a 25 mass % polyelectrolyte solution with an ion exchange capacity of 0.7 meq/g, and proton-conducting fibers (hydrophilic fibrous material) having an average fiber length of 1.5 μm were mixed in a solvent and subjected to dispersion treatment using a planetary ball mill. With 30-minute dispersion, a catalyst ink was prepared. In the prepared catalyst ink, the composition ratio between the starting materials, i.e., between the fibrous material, the carbon as a carrier, and the polyelectrolyte, was 0.6:1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Comparative Example 2-1.

Comparative Example 2-2

[Preparation of Catalyst Ink]

A platinum-carrying carbon catalyst (catalyst support particles) with a loading density of 50 mass % and no hydrophobic coating, and a 25 mass % polyelectrolyte solution with an ion exchange capacity of 0.7 meq/g were mixed in a solvent and subjected to dispersion treatment using a planetary ball mill. With 30-minute dispersion, a catalyst ink was prepared. In the prepared catalyst ink, the composition ratio between the starting materials, i.e., between the carbon as a carrier, and the polyelectrolyte, was 1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The catalyst ink prepared as described above was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The Substrate on which an Electrocatalyst Layer Serving as an Anode was Formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Comparative Example 2-2.

<Evaluation>

[Power Generation Characteristics]

The membrane electrode assemblies obtained in Example 2-1 and Comparative Examples 2-1 and 2-2 were each bonded to two pieces of carbon paper as gas diffusion layers so as to be sandwiched therebetween, thereby preparing samples. The samples were each set in a power generation evaluation cell, and current and voltage were measured using a fuel cell measurement device. The cell temperature during the measurement was 60° C., and high humidification and low humidification set forth below were used as operation conditions. Hydrogen as a fuel gas was passed at a flow rate achieving a hydrogen utilization of 80%, while air as an oxidant gas was passed at a flow rate achieving an oxygen utilization of 40%. The back pressure was 50 kPa.

[Operation Conditions]

Condition 1 (high humidification): Relative humidity was 90% RH for anode, and 80% RH for cathode.

Condition 2 (low humidification): Relative humidity was 90% RH for anode, and 30% RH for cathode.

[Measurements]

The membrane electrode assembly of Example 2-1 showed better power generation performance under the high humidification operation conditions than the membrane electrode assemblies of Comparative Examples 2-1 and 2-2.

Furthermore, even under the high humidification operation conditions, the membrane electrode assembly of Example 2-1 exhibited power generation performance of a level equivalent to the power generation performance under the low humidification operation conditions. In particular, the power generation performance near current density of 1.2 A/cm$^2$ was improved.

The membrane electrode assembly of Example 2-1 exhibited power generation characteristics of having a cell voltage at a current density of 1.2 A/cm$^2$ which was higher by 0.22 V than the cell voltage at a current density of 1.2 A/cm$^2$ of the membrane electrode assembly of Comparative Example 2-1, and having a cell voltage at a current density of 1.2 A/cm$^2$ which was higher by 0.27 V than the cell voltage at a current density of 1.2 A/cm$^2$ of the membrane electrode assembly of Comparative Example 2-2.

As a result of comparing the membrane electrode assembly of Example 2-1 with the membrane electrode assemblies of Comparative Examples 2-1 and 2-2 in terms of power generation characteristics, it was confirmed that the membrane electrode assembly of Example 2-1 showed high drainage performance, and the power generation characteristics thereof under the high humidification operation conditions were equivalent to those under the low humidification operation conditions.

Furthermore, under the low humidification operation conditions, the membrane electrode assembly of Example 2-1 exhibited power generation characteristics of having a cell voltage at a current density of 1.2 A/cm$^2$ which was higher by 0.27 V than the cell voltage at a current density of 1.2 A/cm$^2$ of the membrane electrode assembly of Comparative Example 2-1, and having a cell voltage at a current density of 1.2 A/cm$^2$ which was higher by 0.29 V than the cell voltage at a current density of 1.2 A/cm² of the membrane electrode assembly of Comparative Example 2-2.

As a result of comparing the membrane electrode assembly of Example 2-1 with the membrane electrode assemblies of Comparative Examples 2-1 and 2-2 in terms of power generation characteristics, it was confirmed that the membrane electrode assembly of Example 2-1 showed high drainage performance for water produced by electrode reaction, and water retention thereof under the low humidification conditions was not hindered.

(Third Embodiment)

[Membrane Electrode Assembly]

As shown in FIG. 1, a membrane electrode assembly 11 according to a third embodiment has a configuration that is the same as that of the membrane electrode assembly 11 according to the first embodiment, and includes a polyelectrolyte film 1, and two electrocatalyst layers 2 and 3 vertically sandwiching the polyelectrolyte film 1.

The electrocatalyst layers 2 and 3 include catalyst support particles, and a polyelectrolyte as in the first embodiment. Of the two electrocatalyst layers 2 and 3, at least one electrocatalyst layer (which may also be termed a modified electrocatalyst layer hereinafter) includes a fibrous material. Both of the electrocatalyst layers 2 and 3 are preferred to be modified electrocatalyst layers.

In the modified electrocatalyst layer, the catalyst support particles are provided with a hydrophobic coating as in the first embodiment.

The modified electrocatalyst layer includes fibrous materials which are a hydrophobic fibrous material and a hydrophilic fibrous material. The hydrophobic fibrous material has an average fiber diameter that is 100 nm or more and 300 nm or less. The hydrophilic fibrous material has an average fiber diameter that is 5 nm or more and 100 nm or less.

The mass of the hydrophobic fibrous material is 0.3 times or more and 0.8 times or less the mass of the carrier in the catalyst support particles. The mass of the hydrophilic fibrous material is 0.1 times or more and 0.3 times or less the mass of the carrier in the catalyst support particles with a hydrophobic coating.

The hydrophobic fibrous material is preferred to have an average fiber length that is 0.7 μm or more and 20 μm or less.

The "average fiber diameter" and the "average fiber length" of each fibrous material are an average fiber diameter and an average fiber length calculated from a SEM image.

The inventor has confirmed that the modified electrocatalyst layer configured as described above has drainage performance; however, the detailed mechanism of the drainage performance is unknown. However, the mechanism can be resumed to be as follows. It should be noted that the present invention should not be constrained at all by the resumed mechanism described below.

The modified electrocatalyst layer, in which the hydrophobic fibrous material and the hydrophilic fibrous material are entangled, exhibits high durability and mechanical properties, e.g., minimizing cracking in the electrocatalyst layer, which would otherwise impair durability. The catalyst support particles with a hydrophobic coating have an affinity for the hydrophobic fibrous material, and thus remain close to the hydrophobic fibrous material. In other words, it is resumed that the catalyst support particles with a hydrophobic coating have no affinity for the hydrophilic fibrous material, and thus exist being away from the hydrophilic fibrous material. It is resumed that the structure formed in this way may drain water produced from electrode reaction in a high current range, and may enhance diffusion of reaction gas, even in the electrocatalyst layers with improved water retention. If catalyst support particles with no hydrophobic coating are used, the catalyst support particles will exhibit hydrophilicity and will have an affinity for the hydrophilic fibrous material, and accordingly will remain close to the hydrophilic fibrous material. In other words, the catalyst support particles with no hydrophobic coating have no affinity for the hydrophobic fibrous material, and thus remain separated from the hydrophobic fibrous material. It is resumed that, therefore, water produced by electrode reaction may be retained at surfaces of the catalyst support particles in an electrocatalyst layer with improved water retention, and accordingly, it may be difficult to drain water and to enhance diffusion of reaction gas in a high current range.

It is estimated that, if the average fiber diameter of the hydrophobic fibrous material is less than 100 nm, pores are unlikely to be formed in the electrocatalyst layer, due to the high flexibility of the hydrophobic fibrous material. It is also estimated that, if the average fiber diameter of the hydrophobic fibrous material exceeds 300 nm, the hydrophobic fibrous material may not be dispersed as an ink due to the high straightness of the material.

It is estimated that, if the average fiber diameter of the hydrophilic fibrous material is less than 5 nm, pores are unlikely to be formed in the electrocatalyst layer, due to the high flexibility of the hydrophilic fibrous material. It is also estimated that, if the average fiber diameter of the hydrophilic fibrous material exceeds 100 nm, the hydrophilic fibrous material may not be dispersed as an ink due to the high straightness of the material.

It is estimated that, if the mass of the hydrophobic fibrous material is less than 0.3 times the mass of the carrier in the catalyst support particles with a hydrophobic coating, only a fewer number of pores may be formed in the electrocatalyst layer, and due to this, water produced by electrode reaction may not be sufficiently drained in a high current range, and thus diffusion of reaction gas may not be enhanced. It is also estimated that, if the mass of the hydrophobic fibrous material exceeds 0.8 times the mass of the carrier in the catalyst support particles with a hydrophobic coating, a large number of pores may be formed in the electrocatalyst layer, and due to this, it may be difficult to enhance water retention under low humidification conditions.

It is estimated that, if the mass of the hydrophilic fibrous material is less than 0.1 times the mass of the carrier in the catalyst support particles with a hydrophobic coating, only a fewer number of pores may be formed in the electrocatalyst layer, and due to this, water produced by electrode reaction may not be sufficiently drained in a high current range, and thus diffusion of reaction gas may not be enhanced. It is also estimated that, if the mass of the hydrophilic fibrous material exceeds 0.3 times the mass of the carrier in the catalyst support particles with a hydrophobic coating, a large number of pores may be formed in the electrocatalyst layer, and due to this, it may be difficult to improve water retention under low humidification conditions.

It is estimated that, if the average fiber length of the hydrophobic fibrous material is less than 0.7 μm, mechanical properties may be impaired, due to the weak entanglement of the hydrophobic fibrous material. It is also estimated that, if the average fiber length of the hydrophobic fibrous material exceeds 20 μm, the hydrophobic fibrous material may not be dispersed as an ink due to the strong entanglement of the material.

According to the membrane electrode assembly 11 of the third embodiment, increase of interface resistance does not impair power generation characteristics, unlike in the case of enhancing drainage performance by changing the configuration of the electrocatalyst layer as in the conventional art. Accordingly, the polymer electrolyte fuel cell provided with the membrane electrode assembly 11 can enhance power generation characteristics in a high current range where a large amount of water is produced, compared to the polymer electrolyte fuel cell provided with a conventional membrane electrode assembly.

[Polymer Electrolyte Fuel Cell]

The configuration of the polymer electrolyte fuel cell 12 according to the third embodiment is the same as that of the polymer electrolyte fuel cell 12 described in the first embodiment. Therefore, description is omitted herein.

[Method of Producing Electrocatalyst Layer]

Next, an example of a method of producing a modified electrocatalyst layer according to the third embodiment will be described.

The modified electrocatalyst layer is produced using a method including a first process and a second process described below.

The first process is a process of producing a catalyst ink including catalyst support particles with a hydrophobic coating, a hydrophobic fibrous material, a hydrophilic fibrous material, a polyelectrolyte, and a solvent.

The second process is a process of forming a modified electrocatalyst layer by applying the catalyst ink obtained in the first process onto a substrate and drying the solvent.

It should be noted that an electrocatalyst layer that is not a modified electrocatalyst layer may also be produced through similar processes.

Two electrocatalyst layers 2 and 3 prepared are bonded to respective upper and lower surfaces of a polyelectrolyte film 1 to obtain a membrane electrode assembly 11.

[Details]

The membrane electrode assembly 11 and the polymer electrolyte fuel cell 12 of the third embodiment are different from those of the first embodiment in that the fibrous material has been replaced by a hydrophobic fibrous material and a hydrophilic fibrous material, and are the same in other components, such as the type of the polyelectrolyte, as the first embodiment. Therefore, only the hydrophobic fibrous material and the hydrophilic fibrous material will be described herein, and other components, such as the type of the polyelectrolyte, will be omitted from description.

The hydrophobic fibrous material may, for example, be electron-conducting fibers. The electron-conducting fibers may be carbon fibers, carbon nanotubes, carbon nanohorns, electrically conductive polymer nanofibers, or the like.

For the hydrophobic fibrous material, fibers of the above types may be used singly or in combination of two or more. The hydrophobic fibrous material is preferred to include at least one selected from the group consisting of carbon nanofibers, and carbon nanotubes, among the fibers mentioned above.

The hydrophilic fibrous material may, for example, be electron-conducting fibers having a number of hydrophilic groups as a result of being subjected to an oxidation treatment, or the like. The electron-conducting fibers having hydrophilic groups may be carbon fibers, carbon nanotubes, carbon nanohorns, electrically conductive polymer nanofibers, or the like obtained as a result of oxidation treatment.

For the hydrophilic fibrous material, fibers of the above types may be used singly or in combination of two or more. The hydrophilic fibrous material is preferred to include at least one selected from the group consisting of carbon nanofibers imparted with hydrophilic groups, and carbon nanotubes imparted with hydrophilic groups, among the fibrous materials mentioned above.

<Advantageous Effects and Others>

The third embodiment describes a membrane electrode assembly 11 exhibiting high power generation characteristics under high humidification conditions, a method of producing the membrane electrode assembly 11, and a polymer electrolyte fuel cell 12 provided with the membrane electrode assembly 11. The third embodiment can achieve high durability and mechanical characteristics in the electrocatalyst layers 2 and 3 of the membrane electrode assembly 11 due to entanglement of the hydrophobic fibrous material and the hydrophilic fibrous material therein, so that the occurrence of cracking can be reduced or prevented in the electrocatalyst layers, which would otherwise impair durability. The catalyst support particles with a hydrophobic coating have an affinity for the hydrophobic fibrous material, and thus remain close to the hydrophobic fibrous material, and remain separated from the hydrophilic fibrous material. The structure formed may drain water produced from electrode reaction in a high current range, and may enhance diffusion of reaction gas, even in the electrocatalyst layers with improved water retention.

The membrane electrode assembly produced through the method of producing an electrocatalyst layer according to the third embodiment can improve drainage in a high current range where a large amount of water is produced, without hindering water retention under low humidification conditions, and can exhibit high power generation performance and durability even under high humidification conditions, as in the first embodiment. Using the method of producing an electrocatalyst layer according to the third embodiment, the membrane electrode assembly as described above can be easily and economically produced with efficiency.

In other words, the membrane electrode assembly described above can be produced by simply forming electrocatalyst layers using a catalyst ink in which platinum-carrying carbon catalyst (catalyst support particles) with a hydrophobic coating, a polyelectrolyte, a hydrophobic fibrous material, and a hydrophilic fibrous material are dispersed in a solvent.

Accordingly, as in the first embodiment, the membrane electrode assembly can be produced without complicated production processes, and in addition, use of the electrocatalyst layers produced through the above procedure can improve both water retention and reaction gas diffusion. Thus, this membrane electrode assembly can be used without special devices, e.g., humidifiers or the like, and can contribute to cost reduction.

Of the electrocatalyst layers 2 and 3 formed on respective surfaces of the polyelectrolyte film 1, one may be a modified electrocatalyst layer described above, as in the first embodiment. In this case, the modified electrocatalyst layer is preferred to be disposed on the air electrode (cathode) side where water is produced due to electrode reaction. However, from the perspective of drainage in a high current range, modified electrocatalyst layers are preferred to be formed on respective surfaces of the polyelectrolyte film 1.

Third Example

Hereunder, a description will be given of a method of producing a modified electrocatalyst layer and a membrane electrode assembly for use in the polymer electrolyte fuel cell according to the third embodiment, through specific examples and comparative examples. However, the third embodiment should not be limited by the following examples and comparative examples.

In the following examples and comparative examples, the two electrocatalyst layers are both modified electrocatalyst layers. Optionally, only one of the two electrocatalyst layers may be a modified electrocatalyst layer.

Example 3-1

[Preparation of Catalyst Ink]

A platinum-carrying carbon catalyst (catalyst support particles) with a loading density of 50 mass % and a hydrophobic coating of 25 nm thickness, a 25 mass % polyelectrolyte solution with an ion exchange capacity of 0.7 meq/g, a hydrophobic fibrous material having an average fiber diameter of 150 nm and an average fiber length of 6 µm, and a hydrophilic fibrous material having an average fiber diameter of 80 nm were mixed in a solvent and subjected to dispersion treatment using a planetary ball mill. With 30-minute dispersion, a catalyst ink was prepared. In the prepared catalyst ink, the composition ratio between the starting materials, i.e., between the hydrophobic fibrous materials, the hydrophilic fibrous material, the carbon as a carrier, and the polyelectrolyte, was 0.5:0.2:1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Example 3-1.

Comparative Example 3-1

[Preparation of Catalyst Ink]

A platinum-carrying carbon catalyst (catalyst support particles) with a loading density of 50 mass % and no hydrophobic coating, a 25 mass % polyelectrolyte solution with an ion exchange capacity of 0.7 meq/g, a hydrophobic fibrous material having an average fiber diameter of 150 nm and an average fiber length of 6 µm, and a hydrophilic fibrous material having an average fiber diameter of 80 nm were mixed in a solvent and subjected to dispersion treatment using a planetary ball mill. With 30-minute dispersion, a catalyst ink was prepared. In the prepared catalyst ink, the composition ratio between the starting materials, i.e., between the hydrophobic fibrous material, the hydrophilic fibrous material, the carbon as a carrier, and the polyelectrolyte, was 0.5:0.2:1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The prepared catalyst ink was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Comparative Example 3-1.

Comparative Example 3-2

[Preparation of Catalyst Ink]

A platinum-carrying carbon catalyst (catalyst support particles) with a loading density of 50 mass % and no hydrophobic coating, and a 25 mass % polyelectrolyte solution with an ion exchange capacity of 0.7 meq/g were mixed in a solvent and subjected to dispersion treatment using a planetary ball mill. With 30-minute dispersion, a catalyst ink was prepared. In the prepared catalyst ink, the composition ratio between the starting materials, i.e., between the carbon as a carrier, and the polyelectrolyte, was 1:0.6 in terms of mass ratio. The solvent in the catalyst ink contained ultrapure water and 1-propanol in a volume ratio of 1:1. The solid content of the catalyst ink was controlled to be 12 mass %.

[Substrate]

As a substrate configuring a transfer sheet, a polytetrafluoroethylene (PTFE) sheet was used.

[Method of Forming Electrocatalyst Layer on Substrate]

The catalyst ink prepared as described above was coated onto the substrate by doctor blading, followed by drying at 80° C. in atmospheric air. The amount of coating was controlled so that the platinum carried was 0.1 mg/cm$^2$ in the electrocatalyst layer serving as a fuel electrode (anode), and that the platinum carried was 0.3 mg/cm$^2$ in the electrocatalyst layer serving as an air electrode (cathode).

[Preparation of Membrane Electrode Assembly]

The substrate on which an electrocatalyst layer serving as an anode was formed, and the substrate on which an electrocatalyst layer serving as a cathode was formed were each punched into a 5 cm by 5 cm square, and were transferred to respective surfaces of a polyelectrolyte film under conditions of 130° C. transfer temperature and 5.0× 10$^6$ Pa transfer pressure, thereby preparing a membrane electrode assembly of Comparative Example 3-2.

<Evaluation>

[Power Generation Characteristics]

The membrane electrode assemblies obtained in Example 3-1 and Comparative Examples 3-1 and 3-2 were each bonded to two pieces of carbon paper as gas diffusion layers so as to be sandwiched therebetween, thereby preparing samples. The samples were each set in a power generation evaluation cell, and current and voltage were measured using a fuel cell measurement device. The cell temperature during the measurement was 60° C., and high humidification and low humidification set forth below were used as operation conditions. Hydrogen as a fuel gas was passed at a flow rate achieving a hydrogen utilization of 90%, while air as an oxidant gas was passed at a flow rate achieving an oxygen utilization of 50%. The back pressure was 100 kPa.

[Operation Conditions]

Condition 1 (high humidification): Relative humidity was 90% RH for anode, and 90% RH for cathode.

Condition 2 (low humidification): Relative humidity was 90% RH for anode, and 40% RH for cathode.

[Measurements]

The membrane electrode assembly of Example 3-1 showed better power generation performance under the high humidification operation conditions than the membrane electrode assemblies of Comparative Examples 3-1 and 3-2.

Furthermore, even under the high humidification operation conditions, the membrane electrode assembly of Example 3-1 exhibited power generation performance of a level equivalent to the power generation performance under the low humidification operation conditions. In particular, the power generation performance near current density of 1.2 A/cm$^2$ was improved.

The membrane electrode assembly of Example 3-1 exhibited power generation characteristics of having a cell voltage at a current density of 1.2 A/cm$^2$ which was higher by 0.20 V than the cell voltage at a current density of 1.2 A/cm$^2$ of the membrane electrode assembly of Comparative Example 3-1, and having a cell voltage at a current density of 1.2 A/cm$^2$ which was higher by 0.22 V than the cell voltage at a current density of 1.2 A/cm$^2$ of the membrane electrode assembly of Comparative Example 3-2.

As a result of comparing the membrane electrode assembly of Example 3-1 with the membrane electrode assemblies of Comparative Examples 3-1 and 3-2 in terms of power generation characteristics, it was confirmed that the membrane electrode assembly of Example 3-1 showed high drainage performance, and the power generation characteristics thereof under the high humidification operation conditions were equivalent to those under the low humidification operation conditions.

Furthermore, under the low humidification operation conditions, the membrane electrode assembly of Example 3-1 exhibited power generation characteristics of having a cell voltage at a current density of 1.2 A/cm$^2$ which was higher by 0.22 V than the cell voltage at a current density of 1.2 A/cm$^2$ of the membrane electrode assembly of Comparative Example 3-1, and having a cell voltage at a current density of 1.2 A/cm$^2$ which was higher by 0.22 V than the cell voltage at a current density of 1.2 A/cm$^2$ of the membrane electrode assembly of Comparative Example 3-2.

As a result of comparing the membrane electrode assembly of Example 3-1 with the membrane electrode assemblies of Comparative Examples 3-1 and 3-2 in terms of power generation characteristics, it was confirmed that the membrane electrode assembly of Example 3-1 showed high drainage performance for water produced by electrode reaction, and water retention thereof under the low humidification conditions was not hindered.

REFERENCE SIGNS LIST

1 . . . Polyelectrolyte film; 2 . . . Electrocatalyst layer; 3 . . . Electrocatalyst layer; 4 . . . Gas diffusion layer; 5 . . . Gas diffusion layer; 6 . . . Air electrode (cathode); 7 . . . Fuel electrode (anode); 8a, 8b . . . Gas channels; 9a, 9b . . . Cooling water channels; 10a, 10b . . . Separator; 11 . . . Membrane electrode assembly (fuel cell membrane electrode assembly); 12 . . . Polymer electrolyte fuel cell.

What is claimed is:

1. A fuel cell membrane electrode assembly, comprising:
   a polyelectrolyte film, and two electrocatalyst layers sandwiching the polyelectrolyte film;
   at least one of the two electrocatalyst layers comprises catalyst support particles with a hydrophobic coating, a polyelectrolyte, and a fibrous material having an average fiber diameter that is 10 nm or more and 300 nm or less; and,
   the fibrous material has a mass that is 0.2 times or more and 1.0 times or less the mass of a carrier in the catalyst support particles.

2. The fuel cell membrane electrode assembly of claim 1, wherein:
   the fibrous material has an average fiber diameter that is 100 nm or more and 200 nm or less; and
   the fibrous material has a mass that is 0.4 times or more and 0.8 times or less the mass of the carrier in the catalyst support particles.

3. The fuel cell membrane electrode assembly of claim 1, wherein the fibrous material has an average fiber length that is 0.7 µm or more and 20 µm or less.

4. The fuel cell membrane electrode assembly of claim 1, wherein the fibrous material has a mass that is 0.5 times or more and 1.0 times or less the mass of a carrier in the catalyst support particles.

5. The fuel cell membrane electrode assembly of claim 1, wherein a thickness of the hydrophobic coating on the catalyst support particles is from 2 nm to 40 nm.

6. A fuel cell membrane electrode assembly, comprising:
   a polyelectrolyte film, and two electrocatalyst layers sandwiching the polyelectrolyte film;
   at least one of the two electrocatalyst layers comprises catalyst support particles with a hydrophobic coating, a polyelectrolyte, and a hydrophilic fibrous material having an average fiber length that is 1 µm or more and 15 µm or less; and
   the hydrophilic fibrous material has a mass that is 0.2 times or more and 2.5 times or less the mass of a carrier in the catalyst support particles.

7. The fuel cell membrane electrode assembly of claim 6, wherein the hydrophilic fibrous material has an average fiber diameter that is 50 nm or more and 0.8 µm or less.

8. The fuel cell membrane electrode assembly of claim 6, wherein the hydrophilic fiber material is fibers having proton conductivity.

9. The fuel cell membrane electrode assembly of claim 6, wherein the hydrophilic fibrous material has a mass that is 0.6 times or more and 2.5 times or less the mass of a carrier in the catalyst support particles.

10. The fuel cell membrane electrode assembly of claim 6, wherein a thickness of the hydrophobic coating on the catalyst support particles is from 2 nm to 40 nm.

11. A fuel cell membrane electrode assembly, comprising:
    a polyelectrolyte film, and two electrocatalyst layers sandwiching the polyelectrolyte film;
    at least one of the two electrocatalyst layers comprises catalyst support particles with a hydrophobic coating, a polyelectrolyte, a hydrophobic fibrous material having an average fiber diameter that is 100 nm or more and 300 nm or less, and a hydrophilic fibrous material having an average fiber diameter that is 5 nm or more and 100 nm or less;

the hydrophobic fibrous material has a mass that is 0.3 times or more and 0.8 times or less the mass of a carrier in the catalyst support particles; and the hydrophilic fibrous material has a mass that is 0.1 times or more and 0.3 times or less the mass of a carrier in the catalyst support particles.

12. The fuel cell membrane electrode assembly of claim 11, wherein the hydrophobic fibrous material has an average fiber length that is 0.7 µm or more and 20 µm or less.

13. The fuel cell membrane electrode assembly of claim 11, wherein the hydrophobic fibrous material has a mass that is 0.5 times or more and 0.8 times or less the mass of a carrier in the catalyst support particles.

14. The fuel cell membrane electrode assembly of claim 11, wherein a thickness of the hydrophobic coating on the catalyst support particles is from 2 nm to 40 nm.

15. A polymer electrolyte fuel cell, comprising:
the fuel cell membrane electrode assembly of claim 1;
two gas diffusion layers sandwiching the fuel cell membrane electrode assembly therebetween; and,
two separators facing each other and sandwiching the fuel cell membrane electrode assembly and the two gas diffusion layers therebetween.

* * * * *